(No Model.)
H. L. McCOY.
CULTIVATOR.
No. 382,180. Patented May 1, 1888.
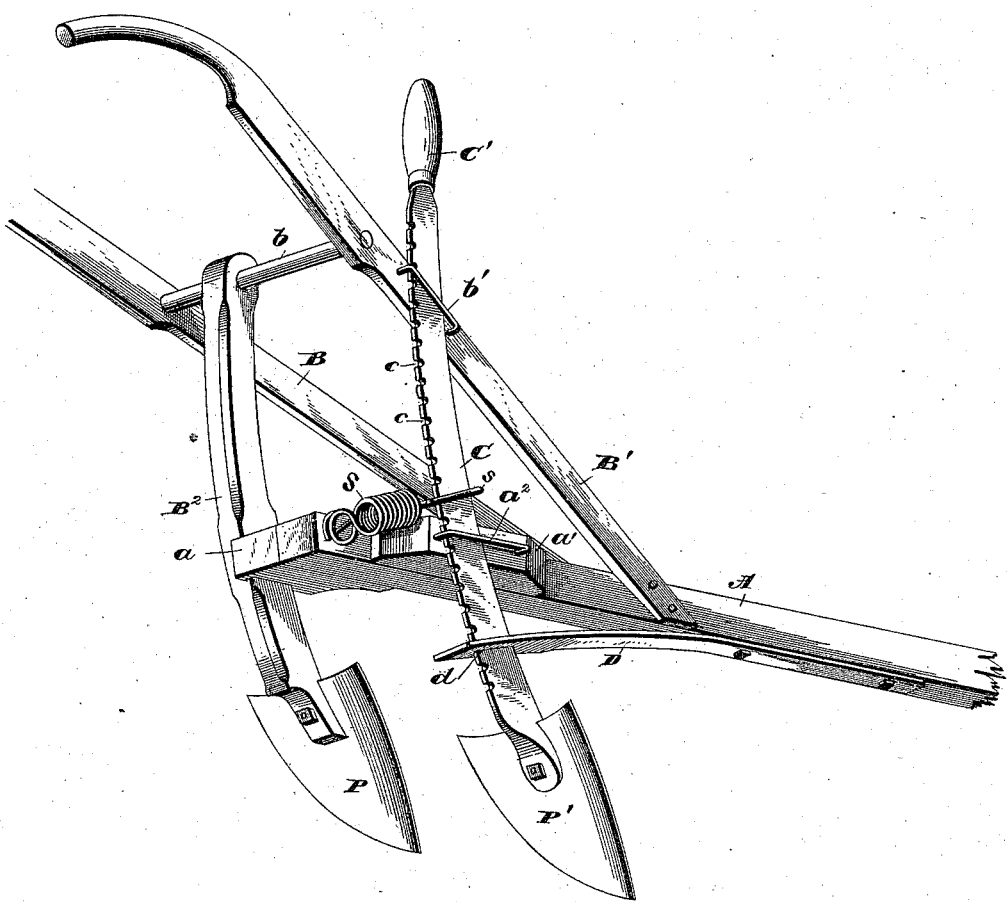
WITNESSES.
G. S. Elliott,
C. M. Johnson.
Henry L. McCoy.
INVENTOR.
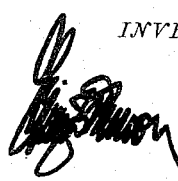
Attorney.

UNITED STATES PATENT OFFICE.

HENRY LINCOLN McCOY, OF LAKE, INDIANA.

CULTIVATOR.

SPECIFICATION forming part of Letters Patent No. 382,180, dated May 1, 1888.

Application filed February 17, 1888. Serial No. 264,387. (No model.)

*To all whom it may concern:*

Be it known that I, HENRY LINCOLN McCOY, a citizen of the United States of America, residing at Lake, in the county of Spencer and State of Indiana, have invented certain new and useful Improvements in Cultivators; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to cultivators; and it consists in the novel construction and arrangement of the parts thereof, which will be more fully hereinafter described, and pointed out in the claims.

The object of my invention is to provide a cultivator having an adjustable standard on one side thereof which carries a plow on its lower end, the parts having a positive connection and adjustment, and of simple and effective construction and operation. I attain this object by the construction illustrated in the accompanying drawing, wherein a perspective view of my improved cultivator is represented, like letters of reference being used to indicate similar parts.

A indicates the main beam, and B and B' the handles, which are connected by a round, $b$. To one side of the rear end of the beam A a mortised block, $a$, is secured, in the mortise of which a standard, $B^2$, is secured, which carries a plow, P, on its lower end, and is formed with an aperture at its upper end through which the round $b$ of the handles B and B' passes. On the opposite side of the beam A another block, $a'$, is secured, a wire loop, $a^2$, being mounted on the outer edge thereof. The plow-handle B' also has a loop, $b'$, secured thereto near the upper end thereof and at the same angle as the said handle. To the under side of the beam A a spring-arm, D, is secured at one end and projects back and downward under the rear of the beam A and outward therefrom at its rear end. The rear of the arm D is provided with a slot, $d$, through which passes a curved metallic beam or bar, C, having rack-teeth $c$ on one edge thereof. The said beam or bar C also passes through the loops $a^2$ and $b'$, respectively, secured to the block $a'$ and handle B'. A coiled spring, S, is secured to the beam A and has a loop, $s$, formed with one end thereof, which also embraces the beam or bar C. The standard C has a plow, P', secured to the lower end thereof, and projects upward above the loop $b'$ on the handle B', in convenient proximity to the ends of the handles B and B', and is of itself provided with a handle, C'. The standard C is adapted to be adjusted by raising and depressing the same, the teeth $c$ thereof engaging with the arm D at one side of the slot $d$ therein. The loops $a^2$ and $b'$ act as guides for said standard C, and the coiled spring S, with its loop $s$, embracing the said standard, keeps the teeth thereof in engagement with the arm D. The resiliency of the arm D allows the shovel P' to have a slight spring movement, and, as shown, for hillside purposes the said shovel is slightly below the shovel P.

The adjustable construction of the standard C is provided for the purpose of plowing at different depths.

I do not limit myself to the length of the bar C, nor to the form of cultivator-shovel used, as other forms might be applied and substituted for those shown.

Having described my invention, I claim—

1. In a cultivator, the combination, substantially as described, of the plow-beam, the stationary plow-standard affixed thereto, and the vertically-adjustable plow-standard formed of a curved flat metallic bar having notches on its rear edge to form a rack-bar.

2. In a cultivator, the combination, substantially as before set forth, of the plow-beam, the stationary standard, the adjustable standard whose rear edge is notched in the form of a rack-bar, the spring slotted plate secured to the under side of the plow-beam, through which the adjustable notched standard passes, and the coiled spring secured to the rear end of the plow-beam and having a looped arm encircling the said adjustable standard.

3. In a cultivator, the combination of the beam A, handles B and B', the metallic slotted arm D, the curved standard C, and the coiled spring S, having the hooked arm $s$, substantially as described.

4. In a cultivator, the combination of the beam A, having blocks $a$ and $a'$ secured to the rear end thereof, the handles B and B', the stationary standard B², the loops $a^2$ and $b'$ arranged as set forth, the metallic slotted spring-arm D, the curved standard C, having its rear edge notched in the form of a rack-bar, and the spring S, having the looped arm $s$, substantially as described.

In testimony whereof I affix my signature in presence of two witnesses.

HENRY LINCOLN McCOY.

Witnesses:
W. H. THOMAS,
W. H. TIPMORE.